(12) United States Patent
Puthenkulam et al.

(10) Patent No.: US 7,826,404 B2
(45) Date of Patent: Nov. 2, 2010

(54) DYNAMIC PACKET ERROR MANAGEMENT FOR WIRELESS COMMUNICATIONS

(75) Inventors: Jose P. Puthenkulam, Beaverton, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 11/267,763

(22) Filed: Nov. 4, 2005

(65) Prior Publication Data

US 2007/0104131 A1    May 10, 2007

Related U.S. Application Data

(62) Division of application No. 11/267,717, filed on Nov. 4, 2005, now Pat. No. 7,499,426.

(51) Int. Cl.
*H04B 7/212* (2006.01)
*H04J 3/08* (2006.01)
*H04W 4/00* (2009.01)

(52) U.S. Cl. .......... 370/321; 370/322; 370/326; 370/329

(58) Field of Classification Search .......... 370/252, 370/321, 322, 326, 329
See application file for complete search history.

(56) References Cited

U.S. PATENT DOCUMENTS

| | | | |
|---|---|---|---|
| 2003/0122632 A1* | 7/2003 | Smidth | 332/103 |
| 2003/0125066 A1* | 7/2003 | Habetha | 455/522 |
| 2004/0151122 A1* | 8/2004 | Lau et al. | 370/252 |
| 2005/0003843 A1 | 1/2005 | Ho et al. | |
| 2005/0197124 A1* | 9/2005 | Kang et al. | 455/439 |
| 2005/0220049 A1 | 10/2005 | Zhang et al. | |
| 2006/0198460 A1* | 9/2006 | Airy et al. | 375/267 |
| 2008/0008097 A1* | 1/2008 | Avadhanam | 370/235 |
| 2009/0252145 A1* | 10/2009 | Meylan et al. | 370/348 |

FOREIGN PATENT DOCUMENTS

| | | | |
|---|---|---|---|
| WO | WO-2004/080086 | | 9/2004 |
| WO | WO 2004/080086 | * | 9/2004 |

OTHER PUBLICATIONS

Office Action mailed Feb. 7, 2008 for U.S. Appl. No. 11/267,717, 9 pgs.
PCT Written Opinion for PCT/US2006/043026 mailed May 15, 2008, 8 pgs.

(Continued)

*Primary Examiner*—Chi H Pham
*Assistant Examiner*—Farah Faroul
(74) *Attorney, Agent, or Firm*—Blakely, Sokoloff, Taylor & Zafman LLP

(57) ABSTRACT

Methods and apparatuses for dynamic error rate management. A wireless station may receive one or more data transfer parameters from another wireless station using a wireless communications protocol. Data may be selected to be transferred between the stations according to the wireless communications protocol based, at least in part, on the one or more data transfer parameters. The one or more data parameters may include a target packet error rate (PER).

16 Claims, 5 Drawing Sheets

OTHER PUBLICATIONS

Office Action for U.S. Appl. No. 11/267,717 mailed Feb. 7, 2008, 9 pgs.

IEEE 802.16g-008r1, "Part 16 Air Interface for Fixed and Mobile Broadband Wireless Access Systems," Oct. 2005, 108 pgs.

Office Action for EP Patent Application No. 06827474.5 mailed Jan. 26, 2009, Whole Document.

PCT Search Report, PCT Search Report for PCT/US2006/043026 mailed Mar. 27, 2007, 11 pp.

* cited by examiner

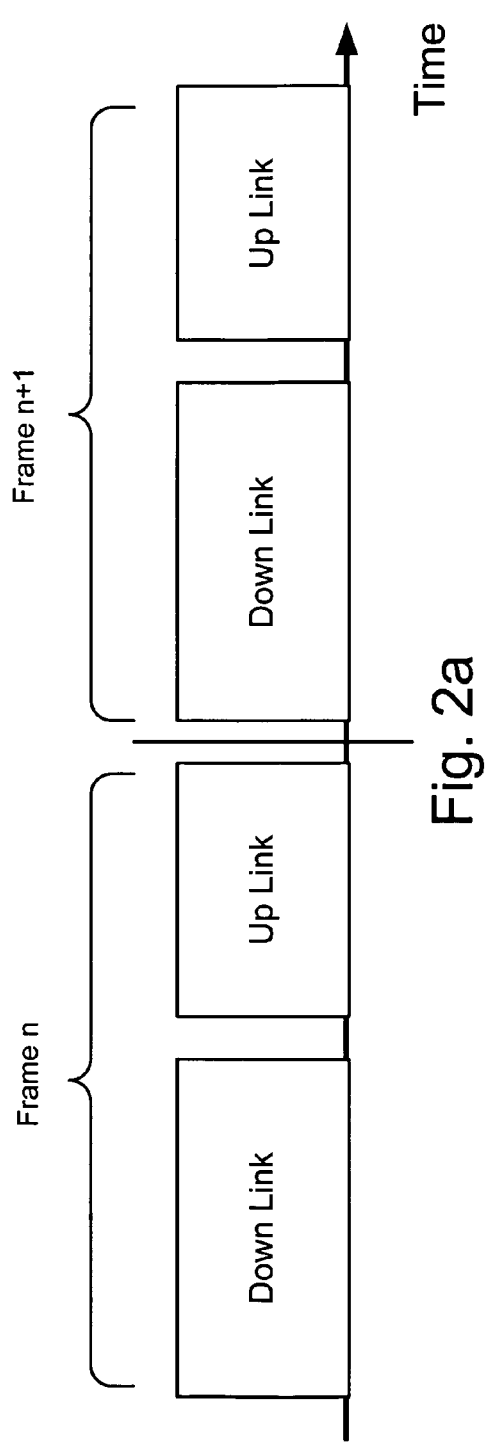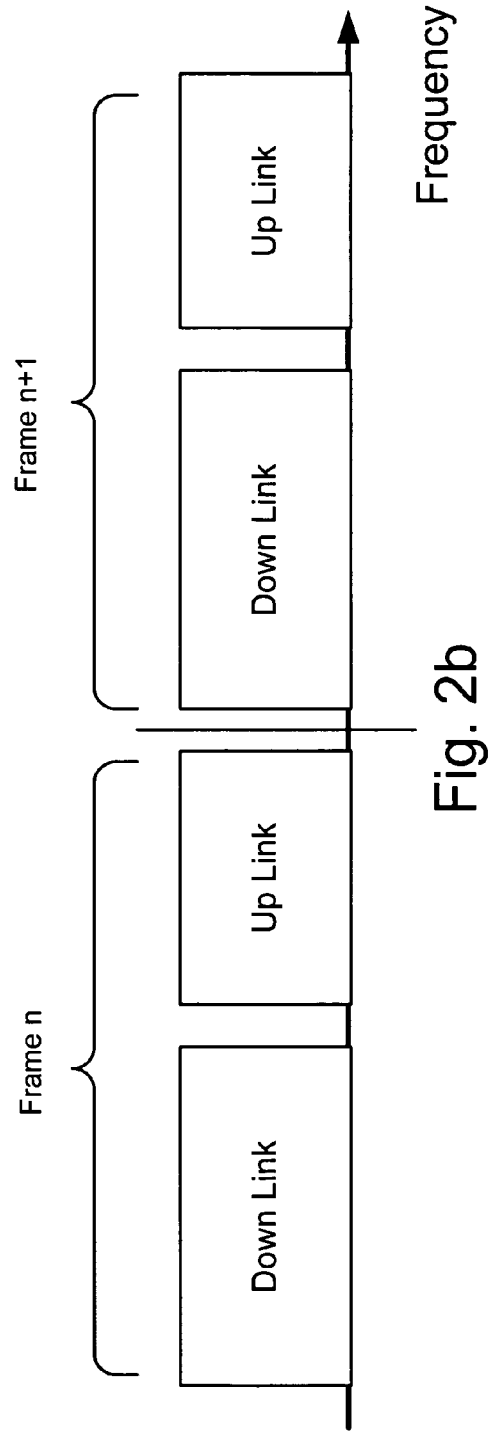

DYNAMIC PACKET ERROR MANAGEMENT FOR WIRELESS COMMUNICATIONS

This U.S. patent application is a divisional of U.S. patent application Ser. No. 11/267,717 filed Nov. 4, 2005 now U.S. Pat. No. 7,499,426, filed concurrently herewith.

TECHNICAL FIELD

Embodiments of the invention relate to wireless networks. More particularly, embodiments of the invention relate to wireless communications conforming to Institute of Electrical and Electronics Engineers (IEEE) 802.16 standards.

BACKGROUND

Broadband wireless access may be used to provide mobile wide area network access (e.g., Internet access) to locations that may or may not have wired network access. A set of standards that define a strategy for broadband wireless access include IEEE 802.16, which is often referred to as WiMAX, includes standards for various elements that may be used to provide broadband wireless access.

IEEE 802.16 standards refer to, for example, Standard IEEE P802.16-2004, "Standard for Local and Metropolitan Area networks—Part 16: Air Interface for Fixed Broadband Wireless Access Systems," and Draft Standard IEEE P802.16e/D12, "Amendment for Physical and Medium Access Control Layers for Combined Fixed and Mobile Operation in Licensed Bands," and Draft Amendment IEEE 802.16g-05/0008r1, "Amendment to IEEE Standard for Local and Metropolitan Area Networks—Management Plane Procedures and Services," as well as related documents.

Most initial WiMAX deployments will be Point to Multipoint (PMP) networks based on centralized scheduling and radio resource management in the base station (BS). The implication of this is that the BS may be required to schedule grants on the uplink (UL) for the remote station (RS) to transmit. In a typical mobile/fixed WiMAX deployment, a RS may have multiple types of applications running concurrently. Different applications may require potentially different PER (Packet Error Rate) targets due to the fact that post-transmission link adaptation algorithms can be used to improve performance with some impairments like latency, which are problematic for voice but may be acceptable for data applications. Based on the UL signal to noise ratio (SNR) of the RS, these different PER targets can be translated to assigning different Modulation coding schemes (MCS) on the UL. The UL MCS is selected using an UIUC (Uplink Interval Usage code).

Hence, a RS may use different UIUC for different applications or potentially even for the same application. As an example, a single video stream may be split into multiple streams having associated connection identifiers (CIDs) with different error rates. If MPEG encoding is used, the I frames on CID1 may have a different packet error ratio (PER) and a less efficient UIUC and the B/P frames on CID2.

Another example could be a RS running a file transfer based on TCP and a latency sensitive streaming application simultaneously on two different CIDs. The TCP connection can operate at a PER as high as, for example, 30%, because it is not extremely delay sensitive, and the underlying MAC layer retransmission mechanism (ARQ/HARQ) or any other post transmission link adaptation mechanism can correct the errors and reduce the "residual error rate." However, for the latency sensitive streaming application, the ARQ cannot operate due to latency constraints—implying that the PER should be much lower—say 1-5%.

IEEE 802.16 standards provide grants for the RS for UL transmission in the UL MAP information elements (IEs). Each IE represents an allocation to a particular RS and specifies the number of UL slots for this allocation, the beginning and ending offsets for this allocation, so that the RS can uniquely identify the allocation. All of the allocations to the RS, happen on the "Basic CID" (which is equivalent to a common control connection) of the RS.

The RS will not be able to able to decode the PER associated with the UL grants and may use the grant with the higher PER for the application that requires the lower PER. This may exacerbated by the fact that the UL channel may changing and the RS my not be able to adapt efficiently to the changes because the BS processes the UL signals, except for the time-varying UIUC values allocated by the BS in the UL grants.

IEEE 802.16 Standard defines Service flows as concept for managing traffic over a wireless connection. The Service flows are mapped to connections identified using CIDs for transporting data across the air. These flows are each scheduled based on the QoS parameters associated with them. However they do not indicate explicitly what type of traffic voice, audio, video, data etc., is being utilized over it that might indicate a particular target PER for proper operation.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 2a is a conceptual diagram of time division duplexed (TDD) uplink and downlink communications.

FIG. 2b is a conceptual diagram of frequency division duplexed (FDD) uplink and downlink communications.

DETAILED DESCRIPTION

Figure 1:
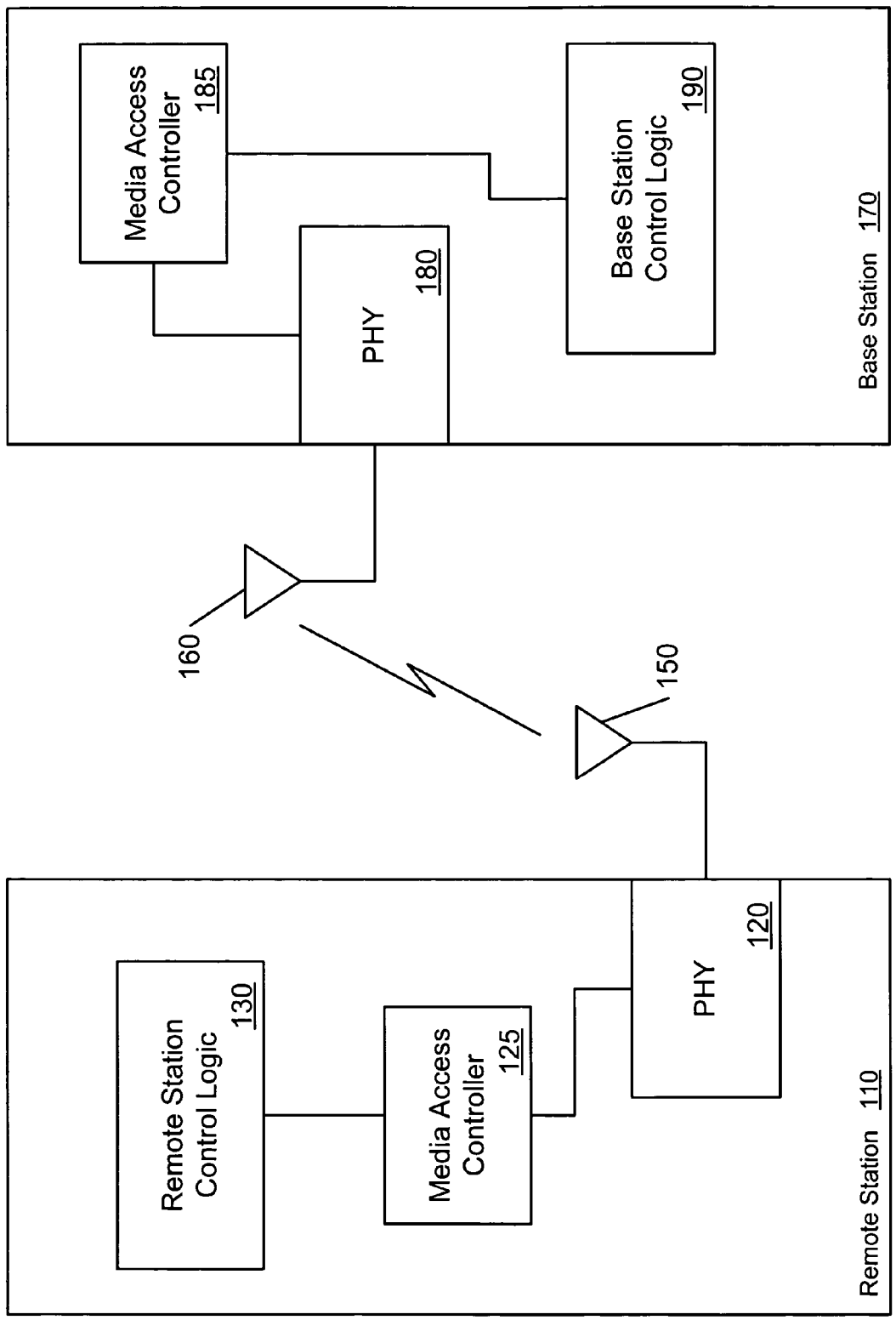
FIG. 1 is a block diagram of one embodiment of a wireless remote station and a wireless base station.

In the following description, numerous specific details are set forth. However, embodiments of the invention may be practiced without these specific details. In other instances, well-known circuits, structures and techniques have not been shown in detail in order not to obscure the understanding of this description.

A described in greater detail below, in line with the IEEE 802.16 design philosophy, the solution described herein may send the uplink grants on a "basic CID" as before. In one embodiment, the RS may be provided with a PER target for the UL grants, so that the RS may schedule either TCP or streaming or VOIP or other applications on the uplink grant, based on the PER advertised in the uplink grant. In one embodiment, the PER may be included in the UL map IE. In one embodiment, the UL MAP IE in the IEEE 802.16 specification may be changed to the following format.

TABLE

One embodiment of a UL MAP IE structure with PER.

| | |
|---|---|
| CID | 16 bits |
| UIUC | 4 |
| PER | 8 |
| If UIUC == 12{ | |
|     OFDMA symbol offset | 8 |
|     Sub channel offset | 7 |
|     # OFDMA symbols | 7 |
|     # subchannels | 7 |
|     Ranging Offset | 2 |
|     Reserved. | 1 |
| } else if UIUC == 14 { | |
|     CDMA-alloc-IE( ) | 32 |
| } else if UIUC ==15 { | |
|     Extended UIUC dependent IE | Variable |
| } else { | |
|     Duration | 10 |
|     Rep coding indication | 2 |
| } | |
| Padding nibble, if needed | 4 |

Packet Error Rate (PER) refers to the probability of the number of MAC layer packets that may be in error as a percentage on frame-by-frame basis. PER is a metric often used to decide whether to perform ARQ schemes for MAC level retransmissions or post transmission link adaptation schemes like Hybrid ARQ (HARQ) on a data transport connection signified by a connection identifier (CID) and directly one-to-one correspondent to a unique service flow identifier (SFID). PER targets may be used to infer the type of traffic (e.g., voice, audio, video, data) that is passing over the service flow. For example, voice packets typically cannot tolerate more than 1% PER for reasonable quality. Data packets, however, can operate with a higher PER with ARQ or HARQ schemes that may improve the overall reliability of the transport.

In one embodiment, the UL map of Table 1 may include the elements as defined in the IEEE 802.16 standards, which may be as set forth above or may be different than the UL map of Table 1. Inclusion of PER data allows information to be communicated between the BS and the RS that may be used to allow the RS to provide a more efficient transmission of data based, at least in part, on the type of data.

The UL map structure of Table 1 may allow communication of PER data between the BS and the RS. In one embodiment, the basic CIDs may be used in the UL MAP IEs because, according to IEEE 802.16 standards, the BS should not schedule on a per application-CID basis for the RS on the UL. The BS may provide a coarse grain allocation and the RS may determine allocations within this coarse grain allocation to schedule application CIDs.

IEEE 802.16 standard service flows have a target for a maximum traffic rate (bit rate) and also have service classes, for example, Unsolicited Grant Service (UGS), Real Time Packet Service (RTPS) or Non-Real Time Packet Service (NRTPS) or Extended RTPS (ERTPS) that could support voice activity detection or Best Effort Service (BES) for managing prioritization of traffic. It is possible to use a combination of priority queues and schemes like HARQ for improving the performance of the transport over the air interface. For this to be even more effective, the techniques described herein using a target PER associated with every service flow may provide a parameter provided by the application layer to ensure that MAC layer operation is better fine tuned and provide the desired traffic management results.

FIG. 1 is a block diagram of one embodiment of a wireless remote station and a wireless base station. The example of FIG. 1 includes only a single remote station for reasons of simplicity of description. A single base station may support any number of remote stations.

In one embodiment, remote station 110 may include remote station control logic 130 coupled with media access controller 125. Remote station control logic 130 may include any combination of hardware, software and/or firmware that allow remote station 110 to function as a wireless station according to a pre-selected protocol (e.g., IEEE 802.16) including the use of PER as described herein. Media access controller 125 may be any type of media access controller known in the art and may be coupled with physical (PHY) link layer logic 120, which may be coupled with antenna 150.

In one embodiment, base station 170 may include base station control logic 190 coupled with media access controller 185. Remote station control logic 190 may include any combination of hardware, software and/or firmware that allow remote station 170 to function as a wireless station according to a pre-selected protocol (e.g., IEEE 802.16) including the use of PER as described herein. Media access controller 185 may be any type of media access controller known in the art and may be coupled with physical (PHY) link layer logic 180, which may be coupled with antenna 160.

As described in greater detail below, remote station control logic 130 and base station control logic 190 may communicate target PER values. In one embodiment the target PER values may be communicated using basic service flows as defined by the IEEE 802.16 standards. According to current IEEE 802.16 standards, remote station 110 may determine the target PER for each service flow. In alternate embodiments, base station 170 may determine target PER values.

FIG. 2a is a conceptual diagram of time division duplexed (TDD) uplink and downlink communications. In TDD communications each frame includes a time for downlink communications from the base station to the remote station and a time for uplink communications from the remote station to the base station. In a one to many configuration where one base station communicates with many remote stations, the base station may determine the portion of the frame (i.e., time period) that is allocated for uplink communications and the portion of the frame (i.e., time period) that is allocated for downlink communications. In addition to determining the amount of time that is allocated for uplink and downlink communications, the base station may determine other parameters, for example, a target or average PER, modulation scheme, coding set, that may be used for the service flows supported. The modulation scheme may be selected from, for example, QPSK, 16QAM, 64QAM, etc.

When engaged in downlink communications, the base station has sufficient information regarding the parameters of the service flows to match downlink data to provide efficient data transfer. However, unless these service flow parameters are communicated to the remote station(s), comparable efficiency for uplink data cannot be achieved. Using the uplink map described herein, parameters for uplink service flows may be communicated to the remote stations, which may be used by the remote stations to provide more efficient data transfer than would otherwise be possible.

If a remote station is allocated two service flows having different PERs, the remote station may have sufficient information to match applications providing data for uplink transmission with service flows having differing parameters. For example, a remote station may have been allocated two service flows, one with a PER of 1% and one with a PER of 20%. The remote station may use the service flow with the PER of 1% for voice traffic (e.g., Voice over IP) and the service flow with the PER of 20% for a data transfer.

In one embodiment, the information transmitted from the base station to the remote station via the UL map includes a PER value that corresponds to a target acceptable packet error rate as a percentage or as any other meaningful indicator. Various parameters may be selected to achieve the desired PER. For example, a modulation scheme and/or a coding set may be selected to achieve the desired PER based on wireless link conditions. These parameters may be dynamically modified periodically and/or as conditions change.

FIG. 2b is a conceptual diagram of frequency division duplexed (FDD) uplink and downlink communications. In FDD communications each frame includes a frequency for downlink communications from the base station to the remote station and a frequency for uplink communications from the remote station to the base station. In a one to many configuration where one base station communicates with many remote stations, the base station may determine the portion of the frame (i.e., frequency range) that is allocated for uplink communications and the portion of the frame (i.e., frequency range) that is allocated for downlink communications. In addition to determining the frequencies that are allocated for uplink and downlink communications, the base station may determine other parameters, for example, a target or average PER, modulation scheme, coding set, that may be used for the service flows supported. The base station and the remote station may communicate using FDD protocols as described above with respect to service flow, or channel, target PER and/or other parameters.

Figure 3:
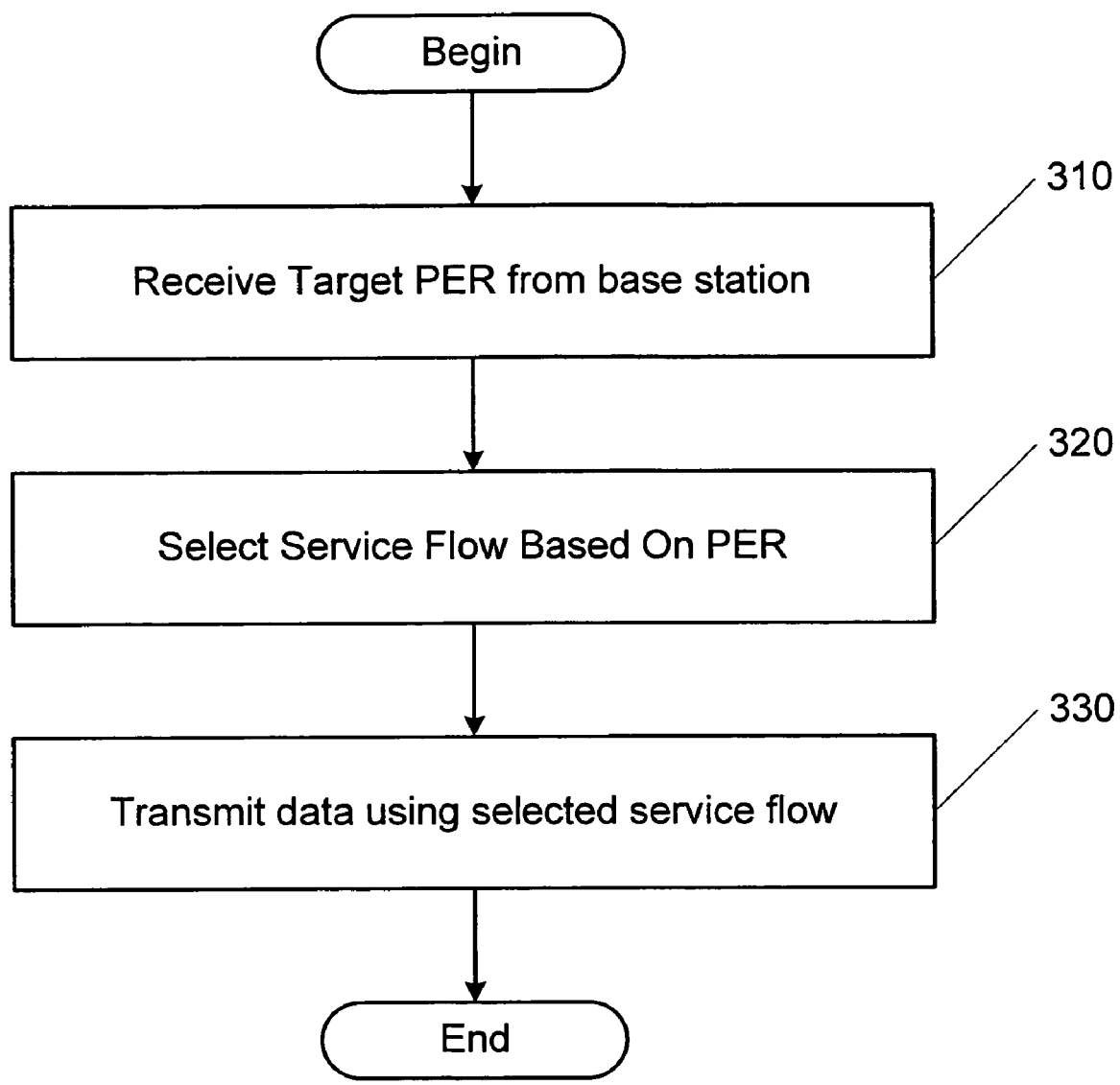
FIG. 3 is a flow diagram of one embodiment of communication of an uplink target PER from a base station to a remote station and uplink transmission based on the target PER.

FIG. 3 is a flow diagram of one embodiment of communication of an uplink target PER from a base station to a remote station and uplink transmission based on the target PER. The functionality of the remote (possibly mobile) station and the base station may be implemented as any combination of hardware, software and/or firmware. In one embodiment, communications between the base station and the remote station conform to the IEEE 802.16 standards; however, other wireless communications standards may also be supported in a similar manner.

The remote station may receive data from a base station that includes a target PER for a corresponding service flow, 310. The target PER may be communicated in, for example, an uplink map information element. In alternate embodiments, the target PER may be communicated in other data structures.

In response to receiving the target PER, the remote station may select one or more service flows for data to be transmitted to the base station, 320. Control logic within the remote station may compare a target PER for a service flow with a type of data to be transmitted (e.g., voice, file transfer, video) to provide an uplink transmission with a PER that provides efficient transmission of data based on the type of data to be transmitted. The selected data may be transmitted from the remote station to the base station, 330.

In one embodiment, after the target PER for a service flow has been determined and/or communicated, the target PER may be dynamically managed. In one embodiment, a Type Length Value (TLV) parameter that may be referred to as a "Target PER TLV" may be used with Dynamic Service Flow Add Request (DSA-REQ) and Response (DSA-RSP) messages. The Target PER TLV may also used in the Dynamic Service Flow Change Request (DSC-REQ) and Response (DSC-RSP) messages when target PER. In one embodiment, the Target PER TLV may have the following format:

EXAMPLE

| Target PER TLV | | | |
|---|---|---|---|
| Type | Length | Value | Scope |
| PER-TV | 1 byte | 1-99 (indicating %) | DSA-REQ/RSP, DSC-REQ/RSP |

In alternate embodiments, other data structures may also be used to communicate changes in target PER.

Figure 4:
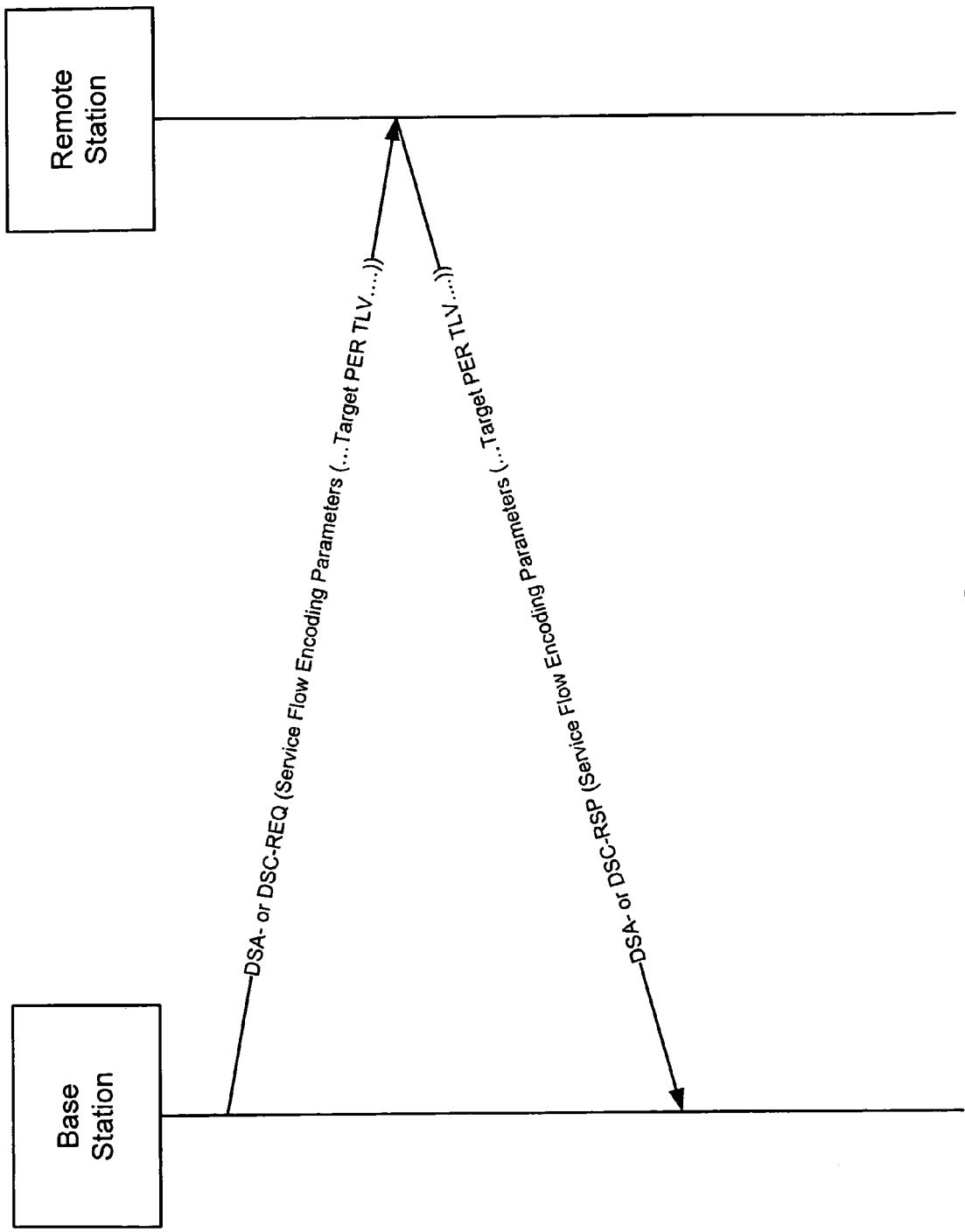
FIG. 4 is a diagram of one embodiment of communication of service flow messages including a target PER.

FIG. 4 is a diagram of one embodiment of communication of service flow messages including a target PER. The example of FIG. 4 may allow the base station and the remote station to communicate changes to a target PER value. Either the base station or the remote station may initiate the changes. In one embodiment, one or more of a Dynamic Service Flow Add Request (DSA-REQ) message, a Response (DSA-RSP) message, a Dynamic Service Flow Change Request (DSC-REQ) message, and a Response (DSC-RSP) message as defined in the IEEE 802.16 standards may be used to carry the target PER TLV.

While the example of FIG. 4 illustrates each of the four messages listed above, not all four are required to communicate changes in the target PER. In one embodiment, a pair of messages (e.g., DSA-REQ and DSA-RESP, DSC-REQ and DSC-RESP) may be used to request and acknowledge changes to the target PER. In an alternate embodiment, one of the messages (e.g., DSA-REQ, DSC-REQ) may be used.

In response to receiving a change to the target PER, the receiving station may send a response acknowledging the change and/or modify a mapping of data to available service flows. In one embodiment, changes to the target PER may result in corresponding changes in modulation scheme and/or coding set. These changes may also be communicated using the messages listed above. These dynamic changes to the target PER for a service flow may allow for more efficient transmission of data as compared to use of a static PER.

Figure 5:
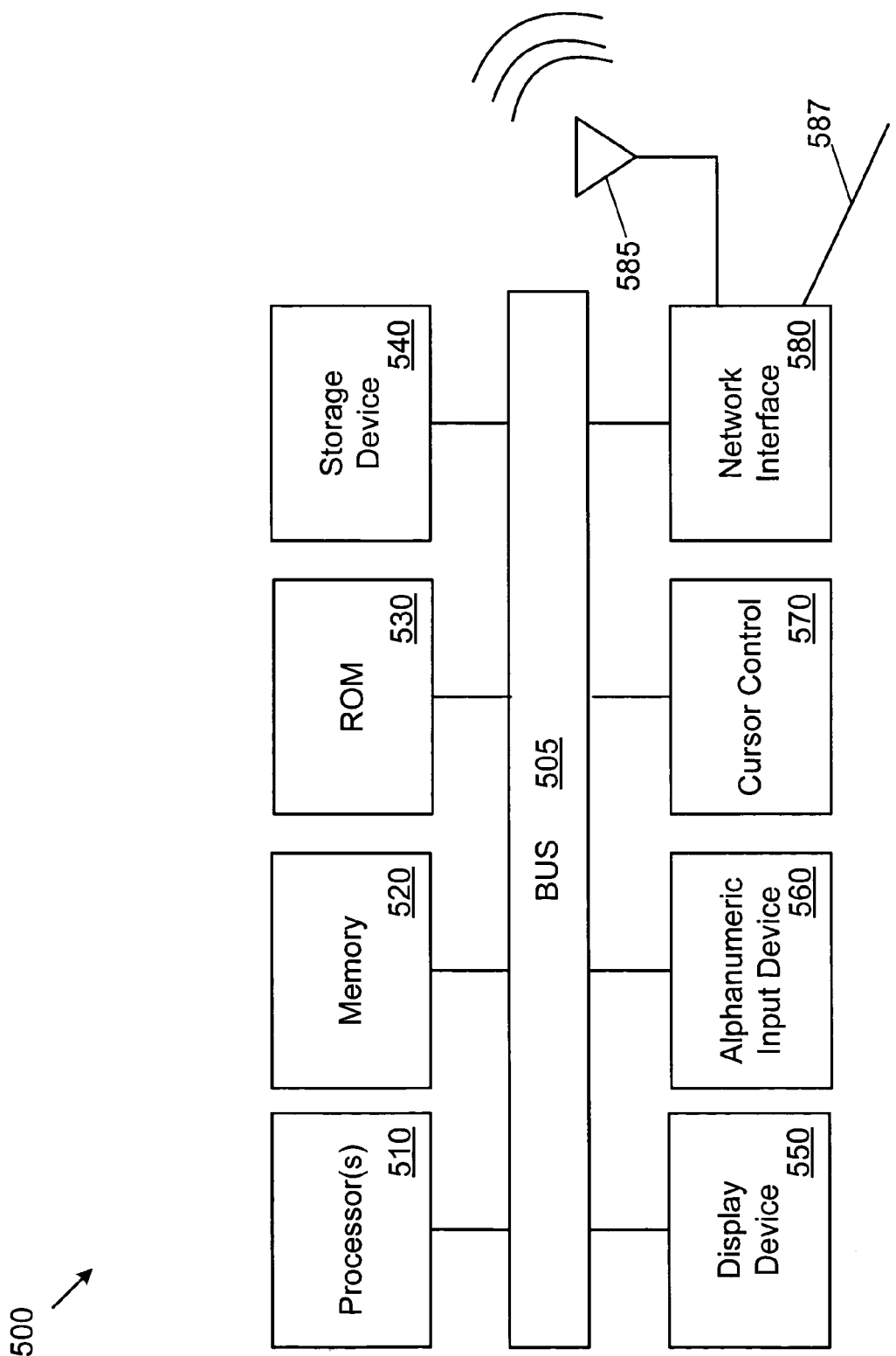
FIG. 5 is a block diagram of one embodiment of an electronic system.

FIG. 5 is a block diagram of one embodiment of an electronic system. The electronic system illustrated in FIG. 5 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components. Electronic system 500 may operate as remote station 110 or as base station 170 of FIG. 1.

Electronic system 500 includes bus 505 or other communication device to communicate information, and processor 510 coupled to bus 505 that may process information. While electronic system 500 is illustrated with a single processor, electronic system 500 may include multiple processors and/or co-processors. Electronic system 500 further may include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Electronic system 500 may also include read only memory (ROM) and/or other static storage device 530 coupled to bus 505 that may store static information and instructions for processor 510. Data storage device 540 may be coupled to bus 505 to store information and instructions. Data storage device 540 such as a magnetic disk or optical disc and corresponding drive may be coupled to electronic system 500.

Electronic system 500 may also be coupled via bus 505 to display device 550, such as a cathode ray tube (CRT) or liquid crystal display (LCD), to display information to a user. Alphanumeric input device 560, including alphanumeric and other keys, may be coupled to bus 505 to communicate information and command selections to processor 510. Another type of user input device is cursor control 570, such as a mouse, a trackball, or cursor direction keys to communicate direction information and command selections to processor 510 and to control cursor movement on display 550.

Electronic system 500 further may include network interface(s) 580 to provide access to a network, such as a local area network. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable. In one embodiment, network interface(s) 580 may provide access to a network, for example, by conforming to IEEE 802.16 standards.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    generating, with a base station, a message having an indication of a target error rate for a selected data transfer flow, wherein the target error rate is different than a previous target error rate for the selected data transfer flow, wherein the base station communicates with multiple remote devices;
    transmitting, according to a wireless communications protocol that conforms to an Institute of Electrical and Electronics Engineers (IEEE) 802.16 standard, the message to a selected remote device having multiple service flows including at least the selected data transfer flow via a basic data transfer flow, wherein the message includes parameters to be used for uplink communications by the selected remote device; and
    transmitting, with the selected remote device, subsequent data via the selected data transfer flow and not applying the target error rate to other service flows, according to the wireless communications protocol, using data transfer parameters selected based, at least in part, on the indication of target error rate.

2. The method of claim 1 wherein the one or more parameters to be used for uplink communications by the selected remote device comprise at least a target packet error rate (PER) for a corresponding uplink data channel.

3. The method of claim 2 further comprising selecting an encoding scheme based, at least in part, on the target PER.

4. The method of claim 2 further comprising selecting a coding set based, at least in part, on the target PER.

5. A method comprising:
    receiving, from a base station communicating with multiple remote stations each having multiple service flows and according to a wireless communications protocol that conforms to an Institute of Electrical and Electronics Engineers (IEEE) 802.16 standard, a message having an indication of a target error rate for a selected data transfer flow, wherein the target error rate is different than a previous target error rate for the selected data transfer flow, wherein the message includes parameters to be used for uplink communications by the selected data transfer flow;
    transmitting subsequent data via the selected data transfer flow, according to the wireless communications protocol, using data transfer parameters selected based, at least in part, on the indication of target error rate and transferring data via other service flows using previous target error rates.

6. The method of claim 5 wherein the one or more parameters to be used for uplink communications by the selected remote device comprise at least a target packet error rate (PER) for a corresponding uplink data channel.

7. The method of claim 6 further comprising selecting an encoding scheme based, at least in part, on the target PER.

8. The method of claim 6 further comprising selecting a coding set based, at least in part, on the target PER.

9. An article of manufacture comprising a non-transitory computer-readable medium having stored thereon instructions that, when executed, cause one or more processors to:
    generate, with a base station, a message having an indication of a target error rate for a selected data transfer flow, wherein the target error rate is different than a previous target error rate for the selected data transfer flow, wherein the base station communicates with multiple remote devices;
    transmit, according to a wireless communications protocol that conforms to an Institute of Electrical and Electronics Engineers (IEEE) 802.16 standard, the message to a selected remote device having multiple service flows including at least the selected data transfer flow via a basic data transfer flow, wherein the message includes parameters to be used for uplink communications by the selected remote device; and transmit, with the selected remote device, subsequent data via the selected data transfer flow and not applying the target error rate to other service flows, according to the wireless communications protocol, using data transfer parameters selected based, at least in part, on the indication of target error rate.

10. The article of manufacture of claim 9 wherein the one or more parameters to be used for uplink communications by the selected remote device comprise at least a target packet error rate (PER) for a corresponding uplink data channel.

11. The article of manufacture of claim 10 further comprising selecting an encoding scheme based, at least in part, on the target PER.

12. The article of manufacture of claim 10 further comprising selecting a coding set based, at least in part, on the target PER.

13. An article of manufacture comprising a non-transitory computer-readable medium having stored thereon instructions that, when executed, cause one or more processors to:
    receive, from a base station communicating with multiple remote stations each having multiple service flows and according to a wireless communications protocol that conforms to an Institute of Electrical and Electronics Engineers (IEEE) 802.16 standard, a message having an indication of a target error rate for a selected data transfer flow, wherein the target error rate is different than a previous target error rate for the selected data transfer flow, wherein the message includes parameters to be used for uplink communications by the selected data transfer flow;

transmit subsequent data via the selected data transfer flow, according to the wireless communications protocol, using data transfer parameters selected based, at least in part, on the indication of target error rate and transferring data via other service flows using previous target error rates.

14. The article of manufacture of claim 13 wherein the one or more parameters to be used for uplink communications by the selected remote device comprise at least a target packet error rate (PER) for a corresponding uplink data channel.

15. The article of manufacture of claim 14 further comprising selecting an encoding scheme based, at least in part, on the target PER.

16. The article of manufacture of claim 14 further comprising selecting a coding set based, at least in part, on the target PER.

* * * * *